United States Patent
Tsirkin (10) Patent No.: US 11,748,131 B2
(45) Date of Patent: Sep. 5, 2023

(54) NETWORK UPDATES FOR VIRTUAL MACHINE MIGRATION

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 513 days.

(21) Appl. No.: 16/689,320

(22) Filed: Nov. 20, 2019

(65) Prior Publication Data
US 2021/0149701 A1    May 20, 2021

(51) Int. Cl.
| | | |
|---|---|---|
| G06F 9/455 | (2018.01) | |
| G06F 8/65 | (2018.01) | |
| H04L 45/02 | (2022.01) | |
| H04L 12/46 | (2006.01) | |
| H04L 12/18 | (2006.01) | |

(52) U.S. Cl.
CPC .......... *G06F 9/45558* (2013.01); *G06F 8/65* (2013.01); *H04L 12/1886* (2013.01); *H04L 12/4679* (2013.01); *H04L 45/02* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 9,197,489 B1 * | 11/2015 | Vincent | ............... H04L 67/148 |
| 9,424,144 B2 | 8/2016 | Sridharan et al. | |
| 10,013,276 B2 | 7/2018 | Fahs et al. | |
| 2011/0063998 A1 * | 3/2011 | Petrisor | ............ B64D 11/00155 |
| | | | 370/254 |

(Continued)

FOREIGN PATENT DOCUMENTS

WO    2018049567 A1    3/2018

OTHER PUBLICATIONS

Jose, Ali, Stanford University; VMware, Inc.—Unaffiliated, "XvMotion: Unified Virtual Machine Migration over Long Distance", https://pdfs.semanticscholar.org/c5d8/32c45456dab302a8e5d2bdc43c93344480d8.pdf, 12 pages.

(Continued)

*Primary Examiner* — Wynuel S Aquino
(74) *Attorney, Agent, or Firm* — Lowenstein Sandler LLP (57) ABSTRACT

Implementations of the disclosure are directed to network updates for virtual machine migration. A method of the disclosure includes receiving an indication over a network that a virtual machine successfully migrated from a source host to a destination host, responsive to the indication, monitoring incoming packets to the source host for an incoming packet having a virtual machine address of the virtual machine at the source host in a destination address field, and upon determining that one or more of the incoming packets to the source host comprise the destination address field having the virtual machine address, providing, to the destination host, a notification that the one or more of the incoming packets having the virtual machine address were received at the source host, the notification indicating that an update of the virtual machine address is to be performed by one or more endpoints of the network.

20 Claims, 6 Drawing Sheets

(56) References Cited

U.S. PATENT DOCUMENTS

| | | | |
|---|---|---|---|
| 2015/0121372 A1* | 4/2015 | Hatta | G06F 9/45558 |
| | | | 718/1 |
| 2016/0119219 A1* | 4/2016 | Fang | H04L 41/122 |
| | | | 370/392 |
| 2017/0041211 A1* | 2/2017 | Pandya | H04L 45/02 |
| 2017/0302686 A1* | 10/2017 | Medvedovsky | H04L 63/1458 |
| 2019/0034112 A1 | 1/2019 | Tsirkin et al. | |
| 2019/0065229 A1 | 2/2019 | Tsirkin et al. | |
| 2020/0045148 A1* | 2/2020 | Mishra | H04L 69/22 |

OTHER PUBLICATIONS

Cisco Technology, "Intelligent Buffer Management on Cisco Nexus 9000 Series Switches White Paper", https://www.cisco.com/c/en/us/products/collateral/switches/nexus-9000-series-switches/white-paper-c11-738488.html, Jun. 6, 2017, 18 pages.

* cited by examiner

NETWORK UPDATES FOR VIRTUAL MACHINE MIGRATION

TECHNICAL FIELD

The disclosure is generally related to virtualization systems, and is more specifically related to network updates for virtual machine migration.

BACKGROUND

Data centers may include clusters of multiple hosts (e.g., physical servers) in racks. Hypervisors may operate on each host to create and run virtual machines (VMs). VMs emulate computer systems and may be referred to as guest machines. The hosts in the clusters may be connected via one or more wired (e.g., Ethernet) and/or wireless (e.g., WiFi) networks (e.g., the Internet, local area network (LAN)). In some instances, a VM on a source host machine may be migrated to a destination host machine within the cluster. To communicate with the migrated VM on the destination host, various components of the networks may be updated with address updates for the VM.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to network updates for virtual machine migration. A virtual machine (VM) may execute via a source hypervisor on a source host in a managed virtualization environment. The VM may be associated with a first address (e.g., a media access control (MAC) address tagged with a virtual local area network (VLAN) address) that corresponds to the source host. The source host may be connected to other hosts via a network. As the VM or the hypervisor sends packets from the source host across the network to other hosts, components (e.g., switches) of the network may inspect the packets and determine that the first address of the VM is coming from a port associated with the source host. This information may be added to a forwarding table maintained by each of the components of the network. As such, when the components receive packets from other hosts that include a destination address set to the address of the VM, the components may forward the packets using the port to the source host.

In some instances, a topology of the network may change, for example, when a VM executing on the source host is migrated to a destination host. A VM may be migrated from one host to another host for a variety of reasons. For example, the source host may be overloaded from a compute capacity perspective and one or more of the source host's VMs may be migrated to another host that is less overloaded. In another example, a VM may be migrated to another host for network latency efficiencies when a destination host with sufficient capacity is located. Migrating VMs while they execute can raise issues related to minimizing the downtime of the VM during the migration.

Latency remains one of the notable issues surrounding VM migration. For example, both the time to migrate a VM and the VM response time after migration can be at issue. Post-copy migration is a technique utilized to improved latency during VM migration. Post-copy migration can improve latency by starting the VM on the destination host while maintaining communication with the source host. Provided good connectivity between the source host and the destination host, post-copy migration provides a partial solution to the latency issue.

Another issue with respect to latency resulting from VM migration is network updates. As part of the migration process of the VM, the network (such as a local area network (LAN)) should consider the destination host as the new location for the VM. Prior to migration, the network had previously observed that packets from the VM were being sent from an address and port corresponding to the source host. However, the VM may now be at a new location in the network (e.g., destination host) and may send packets associated with a different port (of the destination host). Thus, packets from the VM may arrive from a different direction on the different port (e.g., incoming port) at components in the network. Accordingly, in some instances, the destination host may broadcast a notification packet (e.g., reverse address resolution protocol (RARP) packet) using the address of the VM as the source address field in the packet. The notification packet may cause the components of the network to update their forwarding tables with the address and the different port (of the destination host) to enable packets to be sent from and forwarded to the VM at its new location (e.g., on the destination host) in the network.

In conventional managed virtualization environments, the notification packets are sent periodically for a set number of times at specified intervals. As such, even if the network is temporarily congested, eventually the notification packets should reach all of the network. However, the notification packets may get lost and cause network disruption for the VM. If a post-copy migration strategy is implemented, a significant strain is placed on the network in terms of communication bandwidth, which increases the chances of a notification packet getting lost or delayed. This is especially true in a network where multiple VMs may be migrated at the same time. Such a network address update disruption may be observed as bad performance, which may be hard to distinguish from other downtime sources and may be difficult to debug and recover from efficiently.

Aspects of the disclosure address the above and other deficiencies by providing technology directed to network updates for VM migration. In an implementation, a VM may be migrated from a source host to a destination host, resulting in the packets from the VM arriving at a different port on the components in the network. When the VM starts successfully on the destination host, the destination host may broadcast a notification packet including a source address field with the address of the VM. Also, when the VM starts successfully on the destination host, an indication of successful migration to the destination host may be sent to the hypervisor on the source host.

In implementations of the disclosure, a monitoring component (e.g., at the source host, destination host, or a virtualization manager) can keep track of the incoming packets arriving at the source host. The monitoring component may then send a notification to the destination hypervisor over a migration channel established between the source host and the destination host. The notification sent by the monitoring component over the migration channel can be an update notification to notify the destination hypervisor of the incoming packets address to the VM at the source host. In some implementations, the update notification can identify an origin of the incoming packet to the destination hypervisor.

The destination hypervisor may include a notification component that causes another notification packet for the VM to be re-transmitted out on the network based on the received update notification from the monitoring component. In some implementations, either one or both of the source host and/or the virtualization manager may also include a notification component. The notification packet that is re-transmitted by the notification component may be referred to herein as a retransmitted notification packet. The retransmitted notification packet may be directly sent to the specified origin (e.g., endpoint) of the packet using a unicast address. In some implementations, the retransmitted notification packet may be broadcast to the entire network.

As such, the techniques disclosed herein may improve performance of the network by reducing communication downtime of a VM after the VM is migrated to a destination host. Downtime may be reduced by quickly detecting that an address of a migrated VM has not been updated at one or more components in a network of the VM, and causing action to be taken to update the pertinent components in the network with the ports associated with the VM at the new location (e.g., destination host). As a result, network components are more efficiently and quickly updated with a new address of a migrated VM, reducing communication disruptions that may result from lost or delayed notification packets.

Figure 1:
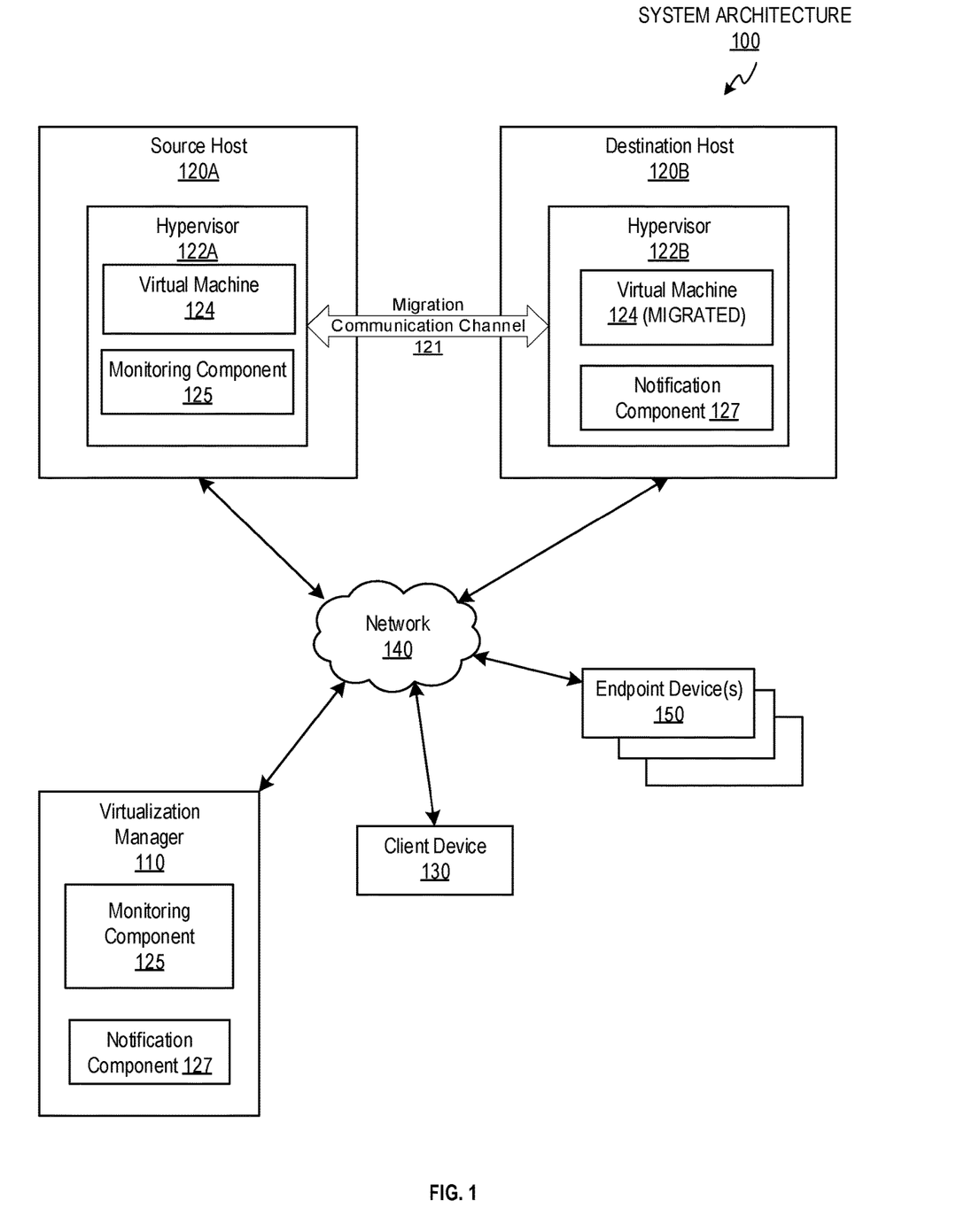
FIG. 1 depicts a high-level diagram of an example system architecture operating in accordance with one or more aspects of the disclosure.

FIG. 1 illustrates an example system architecture 100 in which implementations of the disclosure may operate. The system architecture 100 may include a virtualization manager 110, a plurality of host systems 120A (hereinafter "source host 120A") and 120B (hereinafter "destination host 120B"), a client device 130, and one or more endpoint devices 150 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

The source host 120A and the destination host 120B may comprise one or more processors communicatively coupled to memory devices and input/output (I/O) devices. The source host 120A and the destination host 120B may run a plurality of VMs by executing a hypervisor 122A and 122B, respectively, to abstract the physical layer, including processors, memory, and I/O devices, and present this abstraction to the VMs as virtual devices. For example, as depicted, hypervisor 122A may run VM 124. The VM 124 may execute a guest operating system that may utilize the underlying virtual devices, including virtual processors, virtual memory, and virtual I/O devices.

One or more applications may be running on a VM under the guest operating system. The hypervisors 122A and 122B may create, run, manage, and monitor various aspects of VMs operation, including the processing, and storage, memory, and network interfaces. In an illustrative example, hypervisors 122A and 122B may communicate with the virtualization manager 110 using a Virtual Desktop and Server Management (VDSM) daemon (not shown). The VDSM daemon may include an application programming interface (API) with which the virtualization manager 110 interfaces.

The virtualization manager 110 may be hosted by a computer system and include one or more computer programs executed by the computer system for centralized management of the system architecture 100. In one implementation, the virtualization manager 110 may comprise various interfaces, including administrative interface, reporting interface, and/or application programming interface (API) to communicate with the client device 130, the source host 120A, and the destination host 120B of system architecture 100, as well as to user portals, directory servers, and various other components, which are omitted from FIG. 1 for clarity.

Virtualization manager 110 may provide VM migration management to migrate existing VMs from one host (e.g., source host 120A) to a second host (e.g., destination host 120B). In one example, an administrator may use the client device 130 (e.g., laptop, desktop, tablet, smartphone, server) to request migration of the VM 124 to the destination host 120B. The migration may include copying various data structures (e.g., disks, volumes, etc.) associated with the VM 124 from the source host 120A to the destination host 120B, starting the VM 124 on the destination host 120B, and/or stopping the VM 124 on the source host 120A.

The VDSM or any suitable application executing on the source host 120A and the destination host 120B may provide status notifications to the virtualization manager 110 that indicate the operating state of the hypervisors 122A and 122B and/or the VMs 124. In an example, the hypervisors 122A and 122B may be connected to each other via the network 140 and may send notifications back and forth without sending the notifications to the virtualization manager 110. In one example, the hypervisors 122A, 122B are connected via a migration communication channel 121 established during a migration process of the VM 124. The status notification may be transmitted by the VDSM or other application when the VM 124 is successfully migrated to the destination host 120B and starts to execute on the destination host 120B via the hypervisor 122B.

Additionally, the VDSM or any suitable application may provide a notification that indicates that the hypervisor 122B or the VM 124 sent out a notification packet that includes the VM address in a source address field over the network. Sending the notification packet may cause components (e.g., switches) to identify the address of the VM and update their forwarding tables with the different incoming ports at which the packets from the VM arrived. However, as noted above, the notification packet may not result in the network fully updating (e.g., when a notification packet is lost) and the techniques disclosed herein may be used to detect and resolve such broadcast issues.

In an example, the source host 120A may include a monitoring component 125 and may be referred to as a monitoring node. The monitoring component 125 may be implemented as computer instructions stored on one or more memories and executed by one or more processing devices of the source host 120A. In an example, the monitoring component 125 on the source host 120A may be part of the hypervisor 122A. In another example, the monitoring component 125 on the source host 120A may interface with the hypervisor 122A. There may also be one or more additional monitoring nodes (not shown) that include the monitoring component 125 installed throughout the network 140. The monitoring nodes may be various networking components (e.g., host systems in a cluster, switches, relays, etc.) in the network 140. In some implementations, the destination host 120B may also include a monitoring component 125 (not shown).

In an example, the destination host 120B may include a notification component 127 and may be referred to as a notification node. The notification component 127 may be implemented as computer instructions stored on one or more memories and executed by one or more processing devices of the designation host 120B. In an example, the notification component 127 on the destination host 120B may be part of the hypervisor 122B. In another example, the notification component 127 on the destination host 120B may interface with the hypervisor 122B. In some implementations, the source host 120A may also include a notification component 127 (not shown).

In some implementations, the virtualization manager 110 may also include a monitoring component 125 and a notification component 127, which may be the same as the monitoring component 125 and notification components 127 of the source host 120A and the destination hot 120B. The monitoring component 125 and/or the notification component 127 of the virtualization manager 110 may be implemented as computer instructions stored on one or more tangible, non-transitory computer-readable media executed by one or more processing devices of the computer system hosting the virtualization manager 110.

In implementations of the disclosure, the monitoring component 125 and the notification component 127 are used to perform one or more actions for network updates for VM migration. The monitoring component 125 may receive an indication from the virtualization manager 110 or the hypervisor 122B of the destination host 120B. This received indication may indicate that the VM 124 migrated successfully and started on the destination host 120B. The indication may also include the address of the VM 124 that is executing on the destination host 120B.

Conventionally, the hypervisor 122A may exit or shut down after receiving the indication that the VM migrated successfully (if there are no other VMs running on the source host 120A). As such, in conventional migration processes, the source hypervisor 122A may drop packets ("incoming packets") received at the source host 120A that are addressed to the VM 124 that has migrated. However, in implementations of the disclosure, the hypervisor 122A remains active after migration is complete in order to monitor for incoming packets at the source host 120A with a destination address field set to the address of the VM. The techniques disclosed herein may enable improving performance of the system 100 by detecting when a notification packet has not been delivered for the VM 124 that is migrated (and thus, packets destined for the VM were dropped at the source host 120A) and resolving the notification issue via efficient re-transmission of notification packets to endpoints 150 in the network 140.

In implementations of the disclosure, the monitoring component 125 can keep track of the incoming packets arriving at the source host 120A. In response to receiving the indication of successful VM migration, the monitoring component 125 may begin to monitor the network 140 for incoming packets that have a destination address field set to the address of the VM. For example, the monitoring component 125 may monitor a network interface card (NIC) of the source host 120A for the received incoming packets. In implementations of the disclosure, the incoming packets may be sent from one or more of the endpoint devices 150 of the network 140. The endpoint devices 150 may be other hosts in the network 140 or other nodes capable of communicating across network 140.

In an example, the indication may include an instruction to the monitoring component 125 to monitor for a specific type of incoming packets (e.g., a reverse address resolution protocol (RARP) packet type). This particular packet type may be used when a change is made to a topology of the network 140, and thus, may enhance robustness of detection at the monitoring components 125 by looking for packets that include the address of the VM and have the packet type indicative of a change in the network 140. In other words, also inspecting for the packet type may help the monitoring components 125 not detect an older message sent by the VM before the network change that resulted from migration.

In response to detection of incoming packets at the source host 120A having a destination address field having an address of the VM, the monitoring component 125 may send a notification to the destination hypervisor 122B over the migration channel 121 established between the source host 120A and the destination host 120B. As discussed above, the migration channel 121 may be a communication channel established between the source hypervisor 122A and the destination hypervisor 122B to communicate with respect to migration. For example, in a post-copy migration approach, the migration channel 121 is used to communicate regarding state of memory pages of the VM 124 during the migration process. The migration channel 121 may be further utilized in implementations of the disclosure to communicate notifications regarding packets for the VM 124 that are received at the source host 120A after migration of the VM to the destination host 120B.

The notification sent by the monitoring component 125 over the migration channel 121 may be an update notification to notify the destination hypervisor 122B of the incoming packets at the source host 120A. In some implementations, the update notification can identify a origin (e.g., endpoint 150) of the incoming packet to the destination hypervisor 122B. In one implementation, the identification of the origin may be a network address or other identifier of one or more of the endpoint devices 150 of network 140. In some implementations, the update notification can be a binary flag that indicates that a packet directed to the VM 124 was dropped by the source hypervisor 122A. In this example, the identification of the origin of the dropped packet is not provided by the monitoring component 125, which can help reduce network bandwidth used by the update notifications sent by the monitoring component 125.

In one implementation, the destination hypervisor 122B receives the update notification from the monitoring component 125. As discussed above, the destination hypervisor 122B may include a notification component 127. The notification component can cause another notification packet for the VM 124 to be re-transmitted based on the update notification received from the monitoring component 125. As noted above, the notification component 127 may also be part of the virtualization manager 110 and/or the source host 120A.

The notification packet that is re-transmitted by the notification component 127 may be referred to herein as a retransmitted notification packet. In some implementations, the retransmitted notification packet can be sent to the specified origin (e.g., endpoint 150) of the packet. In some implementations, the retransmitted notification packet may be broadcast to the entire network 140.

To reduce the amount of communication overhead consumed on the network 140, the notification component 127 may detect that a number of addresses corresponding to the dropped packets at the source host 120A exceeds a specified threshold value (also referred to herein as a dropped packet threshold value). When the dropped packet threshold value is exceeded by the number of dropped packets and/or by the number of endpoints 150 identified by the monitoring component 125, the notification component 127 may then notify the originating endpoints 150 (e.g., as a multicast or broadcast communication) via the retransmitted notification packet. This notification can be in lieu of sending individual notifications (via unicast address transmissions) to each originating endpoint 150. In some implementations, the notification component 127 may utilize broadcast (or multicast) communication for multiple addresses, and unicast for a single address.

In some implementations, the notification component 127 may send retransmitted notification packets as a broadcast to the entire network 140 for a first interval of time and then may switch to sending retransmitted notification packets individually to unicast addresses of the identified endpoints 150 associated with dropped packets after the first interval of time. In some implementations, the notification component 127 may utilize a broadcast communication to send the retransmitted notification packet if the notification component 127 is not able to keep up with a rate of incoming update notifications being received from the monitoring component 125.

In some implementations, the notification component 127 may send retransmitted notification packets using a multicast address to particular segments or partitions of the network 140. For example, if the notification component 127 identifies that a particular segment or partition of the network 140 is associated with the dropped packets at the source host 120A (e.g., due to a faulty network cable or connection), then the notification component 127 may send the retransmitted notification packet to those endpoints 150 associated with the segment/partition using a multicast address corresponding to that segment/partition.

Figure 2:
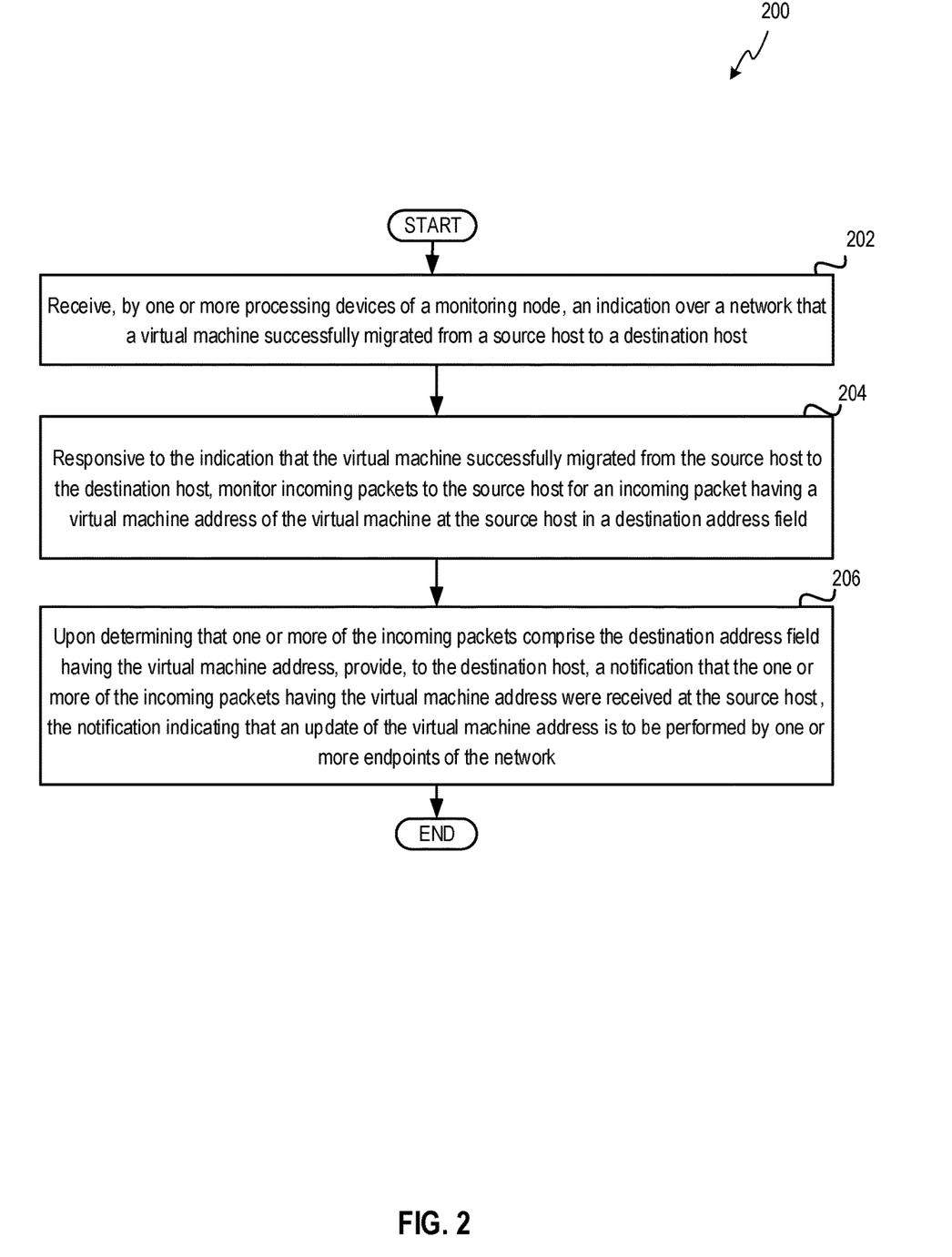
FIG. 2 depicts a flow diagram of an example method for network updates for virtual machine migration, in accordance with one or more aspects of the disclosure.

FIG. 2 depicts a flow diagram of an example method 200 for network updates for VM migration, in accordance with one or more aspects of the disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by monitoring component 125 executed by one or more processing devices of the source host 120A and/or the virtualization manager 110.

Method 200 may begin at block 202. At block 202, a processing device may receive an indication over a network that a VM successfully migrated from a source host to a destination host. The indication may indicate that the VM migrated successfully and started on the destination host. The indication may also include the address of the VM that is executing on the destination host. In an example, the indication may include an instruction to a monitoring component to monitor for a specific type of incoming packets (e.g., a reverse address resolution protocol (RARP) packet type). This particular packet type may be used when a change is made to a topology of the network, and thus, may enhance robustness of detection at the monitoring components by looking for packets that include the address of the VM and have the packet type indicative of a change in the network.

At block 204, the processing device may, responsive to the indication that the VM successfully migrated from the source host to the destination host, monitor incoming packets to the source host for an incoming packet having a VM address of the VM in a destination address field. A monitoring component may begin to monitor the network for incoming packets that have a destination address field set to the address of the VM. For example, the monitoring component may monitor a NIC of the source host for the received incoming packets.

Lastly, at block 206, the processing device may, upon determining that one or more of the incoming packets to the source host include the destination address field having the VM address, provide, to the destination host, a notification that the one or more of the incoming packets having the VM address were received at the source host. The notification indicates that an update of the virtual machine address should be performed by one or more endpoints of the network (e.g., by the endpoint(s) from which the above incoming packets have originated or by all endpoints of the network). In one implementation, the destination hypervisor may include a notification component that causes the notification packet for the VM to be re-transmitted based on the received update notification from the monitoring component. The notification packet that is re-transmitted by the notification component may be referred to herein as a retransmitted notification packet. In some implementations, the retransmitted notification packet can be sent to the specified origin (e.g., endpoint) of the packet. In some implementations, the retransmitted notification packet may be broadcast to the entire network.

Figure 3:
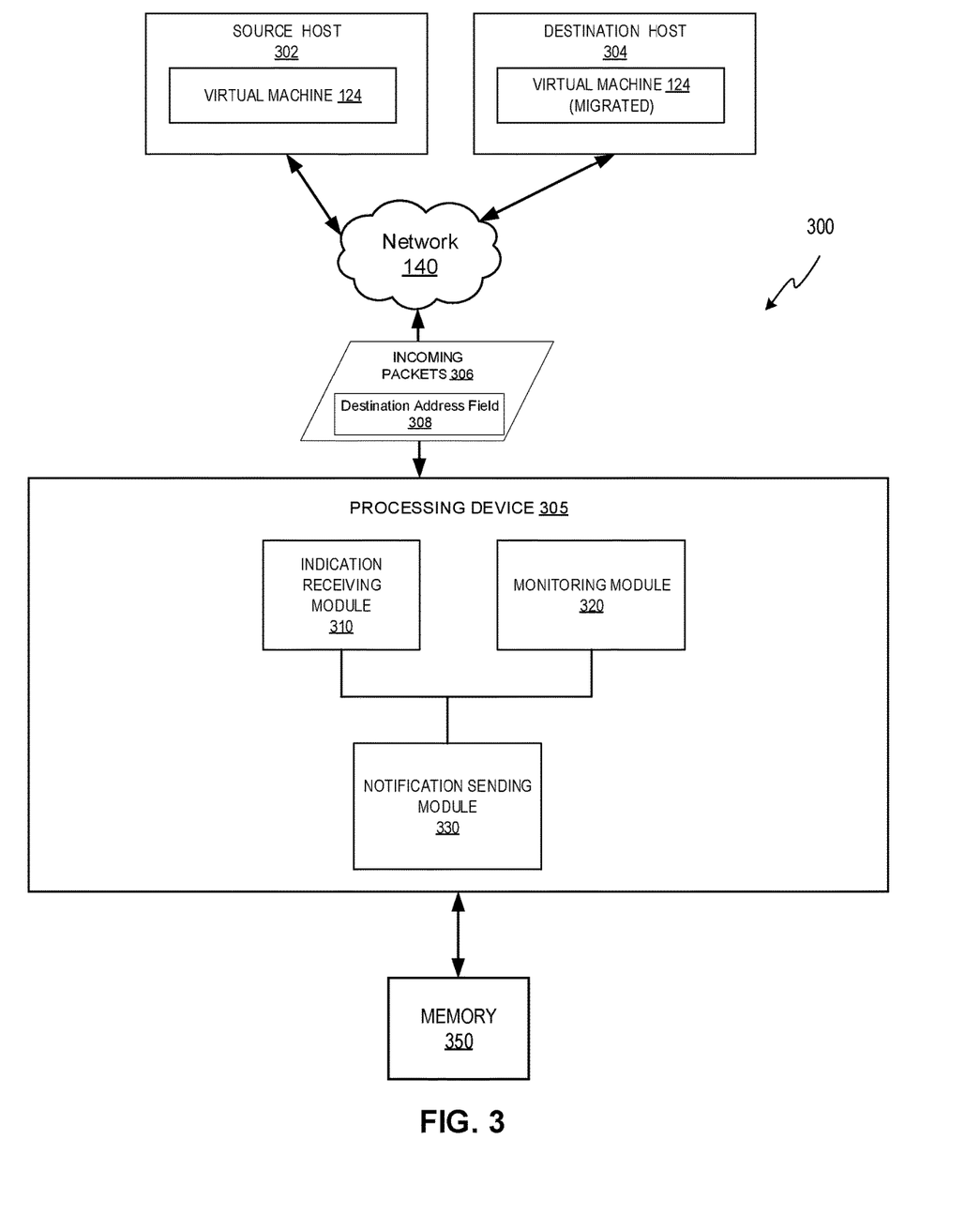
FIG. 3 depicts a block diagram of an example computer system, in accordance with one or more aspects of the disclosure.

FIG. 3 depicts a block diagram of an example computer system 300, in accordance with one or more aspects of the disclosure. Computer system 300 may be the same or similar to the source host 120A, destination host 120B, or the virtualization manager 110 and may include one or more processing devices 305 and one or more memory devices 350. In the example shown, computer system 300 may include indication receiving module 310, monitoring module 320, and notification sending module 330. Also, as depicted, computer system 300 may be communicatively coupled to the source host 302, and destination host 304 via the network 140. Although shown as separate from and connected to the source host 302 (e.g., source host 120A of FIG. 1), the computer system 300 may be part of the source host 302 (e.g., source host 120A). In addition, although shown as separate from and connected to the destination host 304 (e.g., destination host 120B of FIG. 1), the computer system 300 may be part of the destination host 304 (e.g., destination host 120B). Furthermore, the computer system 300 may be part of the virtualization manager (e.g., virtualization manager 110 of FIG. 1).

The indication receiving module 310 may receive an indication over the network 140 that a VM 124 successfully migrated from the source host 302 to the destination host 304. Successfully migrating may refer to the VM 124 successfully starting on the destination host. The indication may be received from the virtualization manager 110 or the destination host 304. In one implementation, the indication may include a VM address of the VM 124 executing on the destination host. In an example, the hypervisor 122A may remain active on the source host 120A after receiving the indication that the migration was successful to enable monitoring for incoming packets to the source host 302.

The monitoring module 320 may, responsive to the indication that the VM 124 successfully migrated from the source host 302 to the destination host 304, start to monitor incoming packets 306 of source host 302 for an incoming packet 306 that includes a destination address field 308 having the VM address at the source host 302.

The notification sending module 330 may, upon determining that one or more of the incoming packets 306 at the source host 302 include the destination address field 308 having the VM address, provide a notification to the destination host 304 that one or more incoming packets 306 were received at the source host 302. This notification to the destination host 304 is to facilitate retransmission of notification packets on the network to cause the VM address to be update to transmit to the destination host 304. For example, the retransmission of a notification packet by the destination host 304 may facilitate updating of forwarding tables in switches of the network 140 with at least the new ports at which packets having the VM address arrive (e.g., the forwarding tables updated entries for the VM address with different incoming ports associated with packets received from the VM 124 on the destination host 304).

Figure 4:
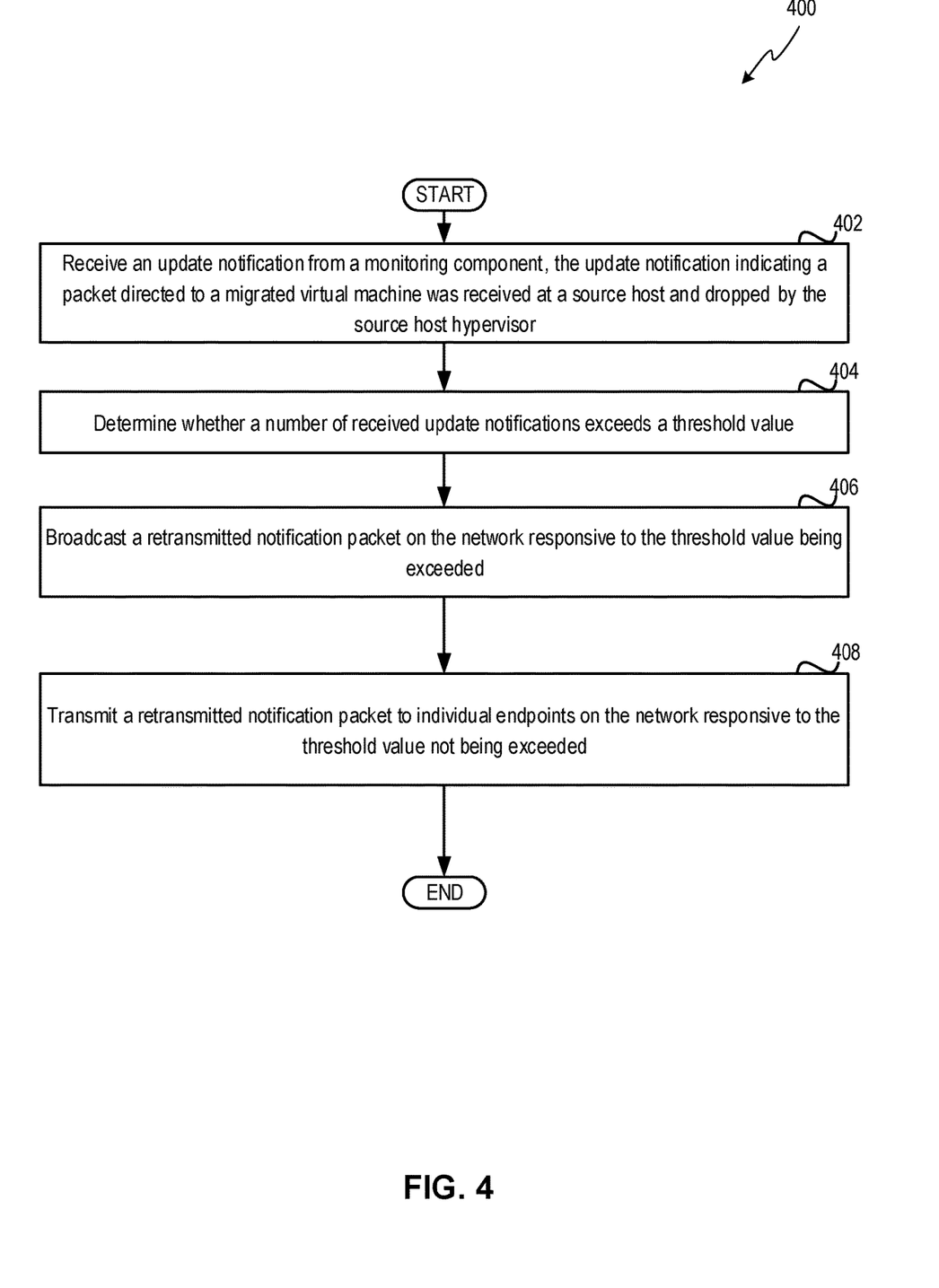
FIG. 4 depicts a flow diagram of another example method for network updates for virtual machine migration by a notification component, in accordance with one or more aspects of the disclosure.

FIG. 4 depicts a flow diagram of an example method 400 for network updates for VM migration at a notification component, in accordance with one or more aspects of the disclosure. Method 400 includes operations performed by the destination host 120A and/or the virtualization manager. In some implementations, method 400 may be performed by the source host 120A, as well. Method 400 may be performed in the same or a similar manner as described above in regards to method 200. Method 400 may be performed by processing devices of the destination host 120B executing the hypervisor 122B and the notification component 127.

Method 400 may begin at block 402. At block 402, the processing device may receive an update notification from a monitoring component. In one implementation, the update notification can indicate that a packet directed to a migrated VM was received at a source host and dropped by the source host hypervisor. Subsequently, at block 404, the processing device may determine whether a number of received update notifications at the destination host meets or exceeds a threshold value.

Then, at block 406, the processing device may broadcast a retransmitted notification packet on the network responsive to the threshold value being met or exceeded. The threshold value may be determined by an administrator of the managed virtualization environment. Utilization of the threshold may provide a baseline where it is more economical (in terms of network bandwidth and/or load) to send a single broadcast message for the notification packet over the network to all components, instead of sending such notification packet to individual components on a one-on-one basis. The utilization of the threshold can help reduce overall network communications, while balancing against the cost of sending an unnecessary notification packet to components that may have already updated the address of the VM. Lastly, at block 408, the processing device may transmit a retransmitted notification packet to individual endpoints on the network responsive to the threshold value not being exceeded. In one implementation, the update notification from the monitoring component may identify the endpoints associated with the received packets at the source host. The identified endpoints can then be individually contacted with the retransmitted notification packet using a unicast address of the endpoint.

Figure 5:
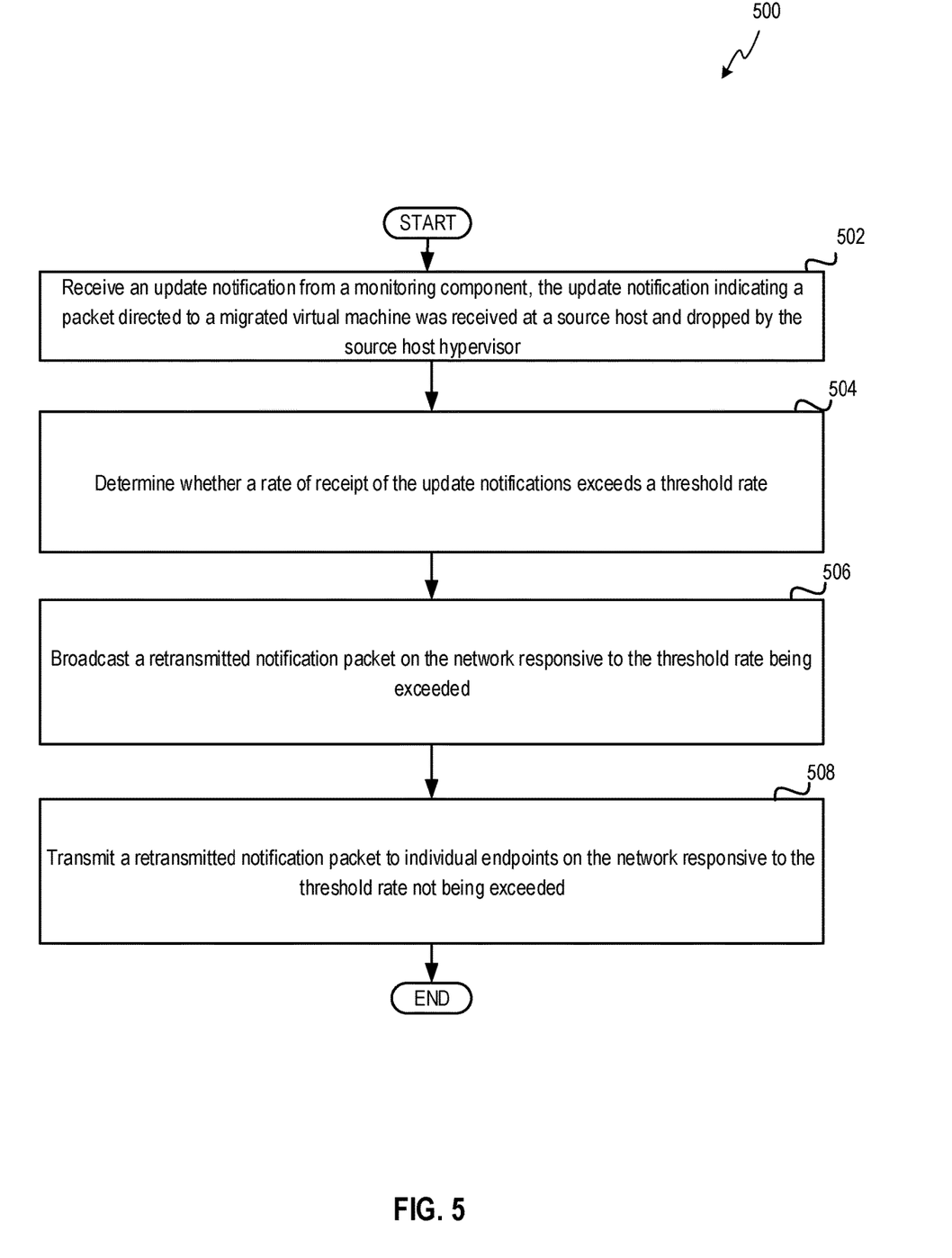
FIG. 5 depicts a flow diagram of another example method for network updates virtual machine migration by a notification component, in accordance with one or more aspects of the disclosure.

FIG. 5 depicts a flow diagram of another example method 500 for network updates for VM migration at a notification component, in accordance with one or more aspects of the disclosure. Method 500 includes operations performed by the destination host 120A and/or the virtualization manager. In some implementations, method 500 may be performed by the source host 120A, as well. Method 500 may be performed in the same or a similar manner as described above in regards to methods 200 and 400. Method 500 may be performed by processing devices of the destination host 120B executing the hypervisor 122B and the notification component 127.

Method 500 may begin at block 502. At block 502, the processing device may receive an update notification from a monitoring component. In one implementation, the update notification can indicate that a packet directed to a migrated VM was received at a source host and dropped by the source host hypervisor. At block 504, the processing device may determine whether a number of received update notifications at the destination host exceeds a threshold rate. The threshold rate may include a ratio of number of update notifications received over a determined period of time.

At block 406, the processing device may broadcast a retransmitted notification packet on the network responsive to the threshold rate being met or exceeded. The threshold rate may be determined by an administrator of the managed virtualization environment. Lastly, at block 408, the processing device may transmit a retransmitted notification packet to individual endpoints on the network responsive to the threshold rate not being exceeded. In one implementation, the update notification from the monitoring component may identify the endpoints associated with the received packets at the source host. The identified endpoints can then be individually contacted with the retransmitted notification packet using a unicast address of the endpoint.

Figure 6:
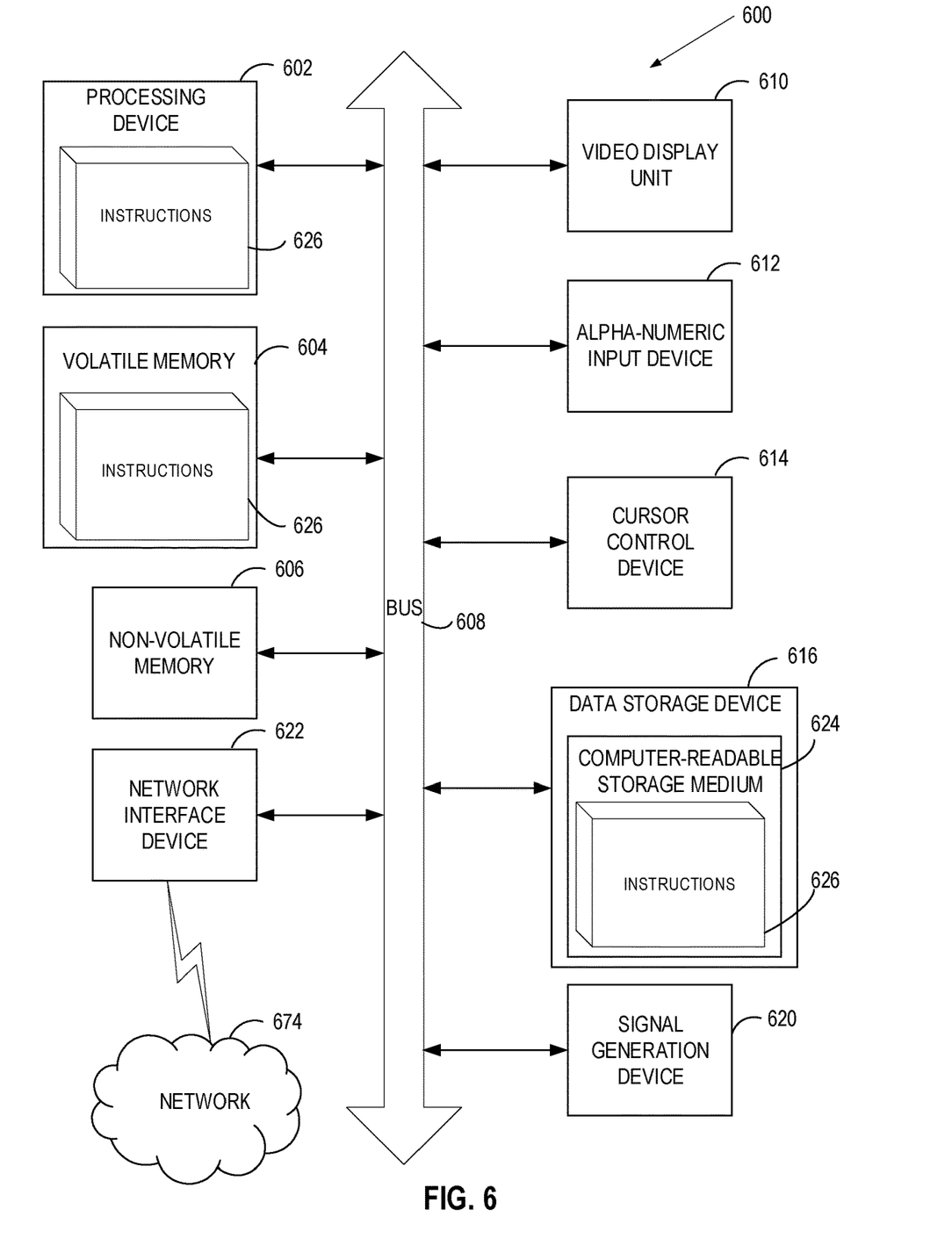
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a computing device within system architecture 100 of FIG. 1. In one implementation, the computer system 600 may be the source host 120A or the destination host 120B. In another implementation, the computer system 600 may be hosting the virtualization manager 110. The computer system 600 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing monitoring component 125 and/or notification component 127 of FIG. 1 for implementing method 200, method 400, and method 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, and 500, and/or each of their individual functions, routines, subroutines, or operations. Examples of the structure for a variety of these systems are set forth in the description above.

The above description is intended to be illustrative, and not restrictive. Although implementations of the disclosure have been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method, comprising:
receiving, by a processing device, an indication over a network that a virtual machine successfully migrated from a source host to a destination host, wherein the indication comprises a virtual machine address of the virtual machine and an instruction to monitor incoming packets of a particular packet type, wherein the particular packet type is indicative of a change in the network;
responsive to the indication that the virtual machine successfully migrated from the source host to the destination host, monitoring incoming packets to the source host for an incoming packet having a destination address equal to the virtual machine address of the virtual machine residing at the source host; and
upon determining that one or more of the incoming packets to the source host have the destination address equal to the virtual machine address of the virtual machine residing at the source host, transmitting, to the destination host, a request to update the virtual machine address;
responsive to transmitting the request, broadcasting a notification packet on the network; and
retransmitting the notification packet to individual endpoints of the network until a number of transmitted requests exceeds a threshold value, wherein the individual endpoints are identified in the request.

2. The method of claim 1, wherein, responsive to the request being transmitted, the destination host is to retransmit the notification packet to cause the update of the virtual machine address at the source host to a virtual machine address at the destination host.

3. The method of claim 2, wherein the notification packet is to facilitate updating of forwarding tables in switches of the network with at least ports associated with the virtual machine address at the destination host.

4. The method of claim 1, wherein, responsive to the request being transmitted, the destination host is to:
determine whether a rate of receipt of notifications exceeds a threshold rate;
broadcast the notification packet on the network responsive to the threshold rate being exceeded; and
retransmit the notification packet to the individual endpoints of the network responsive to the threshold rate not being exceeded.

5. The method of claim 1, wherein notifying the destination host comprises sending a binary indication that the one or more incoming packets were received at the source host.

6. The method of claim 1, wherein notifying the destination host comprises sending identifiers of one or more endpoints originating the one or more of the incoming packets, the identifiers comprising network addresses of the one or more endpoints.

7. The method of claim 1, wherein the processing device is comprised in at least one of the source host or a virtualization manager of the source host and the destination host.

8. The method of claim 1, wherein the destination host is notified that the one or more of the incoming packets were received at the source host over a migration communication channel established between the source host and the destination host.

9. A system comprising:
a memory;
a processing device operatively coupled to the memory, the processing device to:
receive an indication over a network that a virtual machine successfully migrated from a source host to a destination host, wherein the indication comprises a virtual machine address of the virtual machine and an instruction to monitor incoming packets of a particular packet type, wherein the particular packet type is indicative of a change in the network;
responsive to the indication that the virtual machine successfully migrated from the source host to the destination host, monitor incoming packets to the source host for an incoming packet having a destination address equal to the virtual machine address of the virtual machine residing at the source host; and
upon determining that one or more of the incoming packets to the source host have the destination address equal to the virtual machine address of the virtual machine residing at the source host, transmit, to the destination host, a request to update the virtual machine address;
responsive to transmitting the request, broadcast a notification packet on the network; and
retransmit the notification packet to individual endpoints of the network until a number of transmitted requests exceeds a threshold value, wherein the individual endpoints are identified in the request.

10. The system of claim 9, wherein, responsive to the request being transmitted, the destination host is to retransmit the notification packet to cause the update of the virtual machine address at the source host to a virtual machine address at the destination host.

11. The system of claim 10, wherein the notification packet is to facilitate updating of forwarding tables in switches of the network with at least ports associated with the virtual machine address at the destination host.

12. The system of claim 9, wherein notifying the destination host comprises sending a binary indication that the one or more of the incoming packets were received at the source host.

13. The system of claim 9, wherein notifying the destination host comprises sending identifiers of one or more endpoints originating the one or more of the incoming packets, the identifiers comprising network addresses of the one or more endpoints.

14. The system of claim 9, wherein, responsive to the request being transmitted, the destination host is to:
determine whether a rate of receipt of notifications exceeds a threshold rate;
broadcast the notification packet on the network responsive to the threshold rate being exceeded; and
retransmit the notification packet to the individual endpoints of the network responsive to the threshold rate not being exceeded.

15. The system of claim 9, wherein the destination host is notified that the one or more of the incoming packets were received at the source host over a migration communication channel established between the source host and the destination host.

16. A non-transitory computer-readable media storing instructions that, when executed, cause a processing device to:
- receive, by the processing device, an indication over a network that a virtual machine successfully migrated from a source host to a destination host, wherein the indication comprises a virtual machine address of the virtual machine and an instruction to monitor incoming packets of a particular packet type, wherein the particular packet type is indicative of a change in the network;
- responsive to the indication that the virtual machine successfully migrated from the source host to the destination host, monitor incoming packets to the source host for an incoming packet having a destination address equal to the virtual machine address of the virtual machine residing at the source host; and
- upon determining that one or more of the incoming packets to the source host have the destination address equal to the virtual machine address of the virtual machine residing at the source host, transmit, to the destination host, a a request to update the virtual machine address;
- responsive to transmitting the request, broadcast a notification packet on the network; and
- retransmit the notification packet to individual endpoints of the network until a number of transmitted requests exceeds a threshold value, wherein the individual endpoints are identified in the request.

17. The non-transitory computer-readable media of claim 16, wherein notifying the destination host comprises sending identifiers of one or more endpoints originating the one or more of the incoming packets, the identifiers comprising network addresses of the one or more endpoints.

18. The non-transitory computer-readable media of claim 16, wherein, responsive to the request being transmitted, the destination host is to retransmit the notification packet to cause the update of the virtual machine address at the source host to a virtual machine address at the destination host.

19. The non-transitory computer-readable media of claim 16, wherein, responsive to the request being transmitted, the destination host is to:
- determine whether a rate of receipt of notifications exceeds a threshold rate;
- broadcast the notification packet on the network responsive to the threshold rate being exceeded; and
- retransmit the notification packet to the individual endpoints of the network responsive to the threshold rate not being exceeded.

20. The non-transitory computer-readable media of claim 16, wherein notifying the destination host comprises sending a binary indication that the one or more incoming packets were received at the source host.

* * * * *